Figure 1:
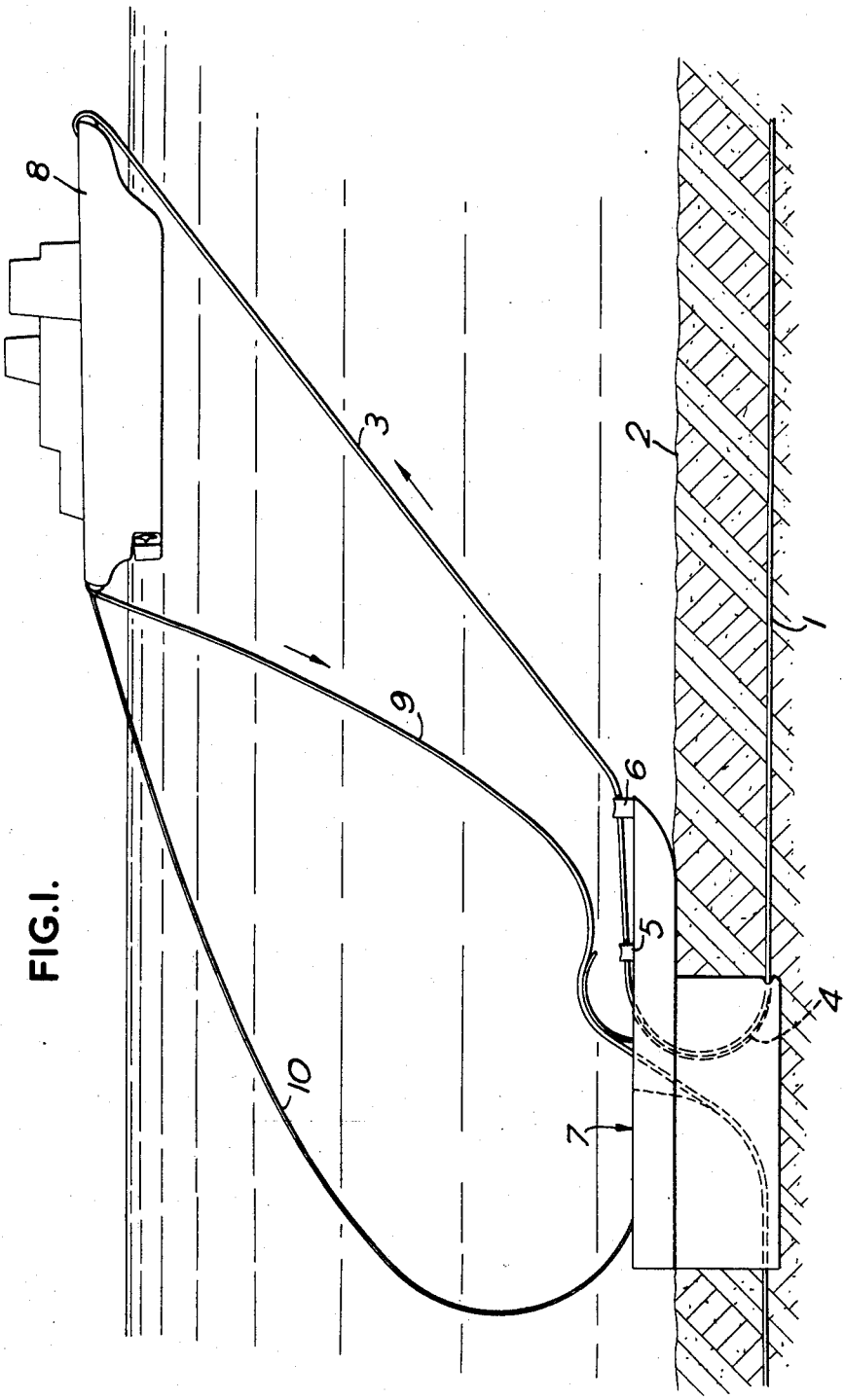

United States Patent [19]
Waterhouse

[11] 3,982,403
[45] Sept. 28, 1976

[54] LAYING CABLES AND THE LIKE UNDER WATER

[75] Inventor: Norman Howard Waterhouse, Windsor, England

[73] Assignee: BICC Limited, London, England

[22] Filed: Dec. 4, 1974

[21] Appl. No.: 529,565

[30] Foreign Application Priority Data
Dec. 6, 1973 United Kingdom ............... 56534/73

[52] U.S. Cl. ................................................ 61/72.4
[51] Int. Cl.[2] ........................ F16L 1/00; E02F 5/02
[58] Field of Search .............. 61/72.4, 72.1, 72.3, 61/72.6, 72.5, 72.7; 37/54

[56] References Cited
UNITED STATES PATENTS

| | | | |
|---|---|---|---|
| 3,338,059 | 8/1967 | Tittle | 61/72.4 |
| 3,431,740 | 3/1969 | Lamy | 61/72.4 |
| 3,462,963 | 8/1969 | Moore | 61/72.4 |
| 3,824,798 | 7/1974 | Shiroyama | 61/72.4 |
| 3,877,237 | 4/1975 | Norman | 61/72.4 |

Primary Examiner—Jacob Shapiro
Attorney, Agent, or Firm—Eugene F. Buell

[57] ABSTRACT

A method of laying a flexible member below the bed of a body of water comprising forming a trench in the bed and laying in it a line having a greater strength and/or a lower cost than the flexible member; and then in a separate second operation laying the flexible member from a cable-laying ship in substantially the same trench by submerged apparatus caused to follow the path of the line. Usually the line will be buried before the second operation commences, and the submerged apparatus then takes the form of a submerged plough which re-forms a trench, on substantially the same route as the original trench. The technique allows the flexible member to be laid on a route known to be free of obstruction.

10 Claims, 2 Drawing Figures

LAYING CABLES AND THE LIKE UNDER WATER

This invention relates to a method of laying an elongate flexible member below the bed of the sea or of some other large body of water. It is primarily useful for laying electric power cables and communication carriers (cables and electromagnetic waveguides, including those proposed for operation at 'optical' frequencies), all hereinafter included, where the context admits, in the expression "cable"; but it can also be used (for example) to lay flexible pipes of relatively low tensile strength.

Except in the deepest waters, submarine cables normally need to be buried in order to avoid the risk of damage due to engagement with trawling gear and/or abrasion arising from tidal movements. Perhaps the ideal method is to excavate a trench first and lay and bury the cable in a separate subsequent operation, but this requires extremely precise navigation and is feasible only for short routes in very shallow water. Another method used is to lay the cable first and then bury it as a second operation. The main problems with this are (a) that the burial operation is relatively slow and expensive, (b) the cable is left exposed between the times of laying and burial, and (c) if the cable is laid over an obstruction it is frequently impossible to alter its position on the sea bed to enable it to be buried.

The preferred conventional method in most cases is therefore to form a trench and lay the cable in it at the same time, using submerged trenching and positioning apparatus known as a "plough". This method works well under good conditions, but if an obstruction (for example a rocky area or a sunken vessel or other wreckage) is encountered it is difficult to divert the cable route around it and there is a risk that the cable will be damaged or even broken in attempting to do so.

In the method in accordance with the present invention, a trench is formed in the bed of the sea or other body of water and there is laid in it a line having a greater strength and/or a lower cost than the cable or other flexible member to be laid; and then in a separate second operation the flexible member is laid from a cable-laying ship in substantially the same trench by submerged apparatus caused to follow the path of the line.

Two or more lines may be laid simultaneously, if desired: for example to permit a corresponding number of cables to be laid in succession close together but without risk of fouling one another. Alternatively by using an appropriately equipped vessel, two or more cables or other flexible members may be laid simultaneously following a single line.

The Line will usually be a steel hawser sufficiently protected against corrosion. By using a line of high strength, the risk of damage is greatly reduced, and a line of low value can be abandoned in case of extreme difficulty. If an obstruction is encountered in laying the line, a length of line may be temporarily recovered and re-laid on a new route diverting to avoid the obstruction; or alternatively the laying operation can be suspended and the line held whilst steps are taken to remove the obstruction.

The trench formed in the line-laying operation will often be filled in by natural processes before the laying process proper takes place, and it may be deliberately filled if there is risk of the line being displaced. In both cases the submerged apparatus will take the form of a plough, fitted with suitable guidance instruments, reforming a trench on substantially the same route (but not necessarily of the same cross-section).

The line may be left in position (in which case it may be used, if required, to lay a further cable (or other flexible member) along the same route. Alternatively it may be removed in the second laying operation, in which case the length of line removed gives an accurate and valuable measure of the length of flexible member laid, enabling the paying-out operation on board ship to be reliably regulated: in some cases the removed section of line may be usable as a towing cable for the submerged apparatus.

If the line is of sufficient strength, it may guide the plough or other submerged apparatus purely by direct physical engagement with it, but normally power-assisted guidance is to be preferred: this may be controlled by feelers engaging the line, or contactless position detectors may be used, for example electromagnetic detectors responsive to the ferromagnetic property of a steel line or to a current passed through an insulated element of the line. When the removed section of line is used as a towing cable, the horizontal angle of deflection may be measured and used to guide the movement of the laying vessel: a very simple and robust instrument of a known kind may be used for this purpose.

Especially for the second laying operation, a plough is preferably of the kind using high-velocity water streams to form the trench; preferably high-velocity water streams are also used to clear debris from the line, especially if its position is to be detected by feelers.

In addition to its use in making new installations, the invention is useful in repairing existing installations. In this case the line (unless already present from the time of the initial installation) will be laid in the original trench as the damaged cable or other flexible member is recovered. The new or repaired flexible member can then be laid or re-laid on the original route, which is known to be satisfactory.

Figure 2:
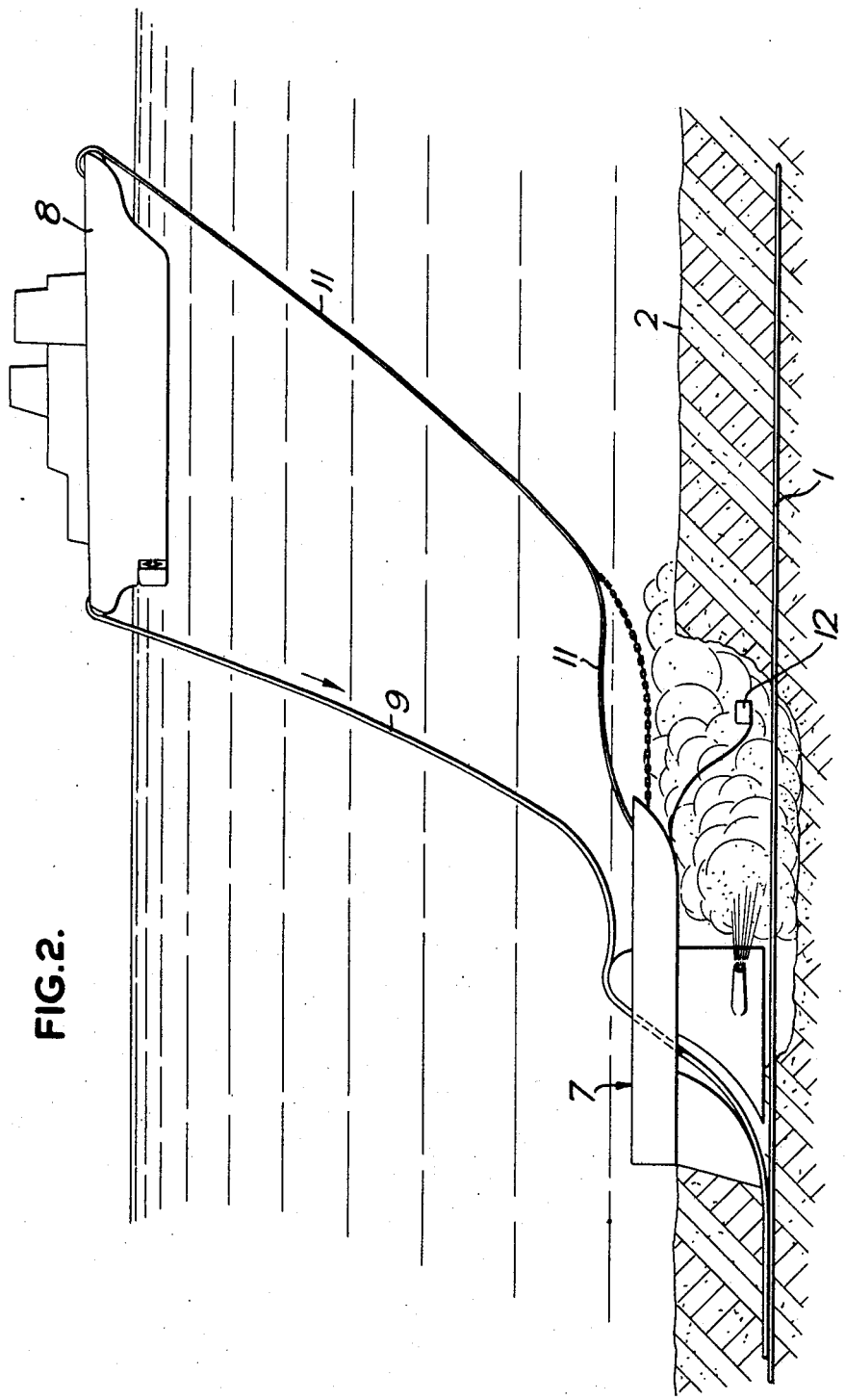

The invention will be further described, by way of example, with reference to the accompanying drawings in which FIGS. 1 and 2 are diagrams illustrating two different methods in accordance with the invention.

In both cases a line 1, which is a steel hawser, is ploughed into the sea bed 2 by a conventional submarine cable laying operation (not shown in the drawings).

In the method of FIG. 1, an end 3 of the line is passed through guides 4, 5, 6 in a cable plough 7 and is drawn into a cablevessel 8 under tension, so as to advance the plough along the still-buried part of the line 1. At the same time, the cable or flexible pipe 9 to be laid is fed from the vessel (normally in synchronism with the drawing-in of the line 1) to the plough 7, which buries it in the conventional way but along substantially the same path as that from which the line 1 has been withdrawn. An auxiliary cable 10 conveys power from the vessel 8 to the plough 7 and control signals in one or both directions. The guide 6 is laterally moveable, for example on a lever pivoted on a vertical axis near the guide 5, and a position indicator is used to signal displacement from the longitudinal axis of the plough; preferable the vessel is navigated so as to reduce any displacement as nearly as possible to zero. When the guide 5 is mounted on a lever, its position can conveniently be indicated by using, at the pivot of the lever, the "Marine Desynn" angle indicator unit, available from Smiths Industries Limited of Waterloo Road, Cricklewood, London NW2, England.

In the alternative method of FIG. 2, the line 1 remains in the sea bed 2 in the completed installation and the plough 7 is towed in the conventional way using a cable 11 that also conveys power to the plough and carries control signals in both directions. A pair of laterally-spaced proximity detectors 12 senses any displacement of the plough from the path of the line 1 and provides an error signal which is used to modify the navigation of the vessel and/or to control the cutting action of the plough so that the plough is maintained substantially of the path of the line 1 and the cable 9 is laid over it or otherwise in close proximity to it. Preferably a further instrument is included for indicating the angle between the plough axis and the towing cable 11 so that the angle (in plan) between the towing cable 11 and the line 1 can be derived.

In heavy-cross-current conditions it may be desirable to modify the method of FIG. 1 by sensing the angle of approach of the cable 9 being laid to the plough and to navigate so as to minimise this angle: the guide-line 1 will normally be less sensitive to any misalignment.

Although the invention has been described with reference to conventional cable ploughs that are directly towed by the laying vessel and receive the cable or other flexible member in a state of free suspension in the water, it will be understood that it could be used with a plough having internal traction means and/or one connected to the vessel by a flexible cable chute.

What I claim as my invention is:

1. A method of laying a flexible member below the bed of a body of water comprising forming a trench in the bed and laying it in a line having with respect to the flexible member at least one characteristic selected from a greater strength and another cost and burying the line; and then in a separate second operation after the line has been buried laying said flexible member from a cable-laying ship by a submerged plough caused to follow the path of said line and to re-form a trench on substantially the same route, lay the flexible member therein, and bury it.

2. A method as claimed in claim 1 in which the plough is of the kind using high-velocity water jets to re-form the trench.

3. A method as claimed in claim 1 comprising leaving the line in position when the flexible member is laid.

4. A method as claimed in claim 1 comprising recovering the line as the flexible member is laid and regulating paying-out of the flexible member on the basis of the length of line removed.

5. A method as claimed in claim 1 comprising recovering said line as said flexible member is laid and utilising it to tow said submerged apparatus.

6. A method as claimed in claim 1 in which the submerged apparatus is guided by direct physical engagement with said line.

7. A method as claimed in claim 1 in which the submerged apparatus is guided by power-assisted means responsive to said line.

8. A method as claimed in claim 7 in which said power-assisted means includes feelers engaging said line.

9. A method as claimed in claim 7 in which said power-assisted means includes a contactless position detector responsive to said line.

10. A method in accordance with claim 1 in which said line is laid along the route of a damaged flexible member being recovered.

* * * * *